(12) United States Patent
Adzic et al.

(10) Patent No.: US 12,219,139 B2
(45) Date of Patent: *Feb. 4, 2025

(54) VIDEO SIGNAL PROCESSOR FOR BLOCK-BASED PICTURE PROCESSING

(71) Applicant: OP Solutions LLC, Amherst, MA (US)

(72) Inventors: Velibor Adzic, Canton, GA (US); Hari Kalva, Boca Raton, FL (US); Borivoje Furht, Boca Raton, FL (US)

(73) Assignee: OP Solutions, LLC, Amherst, MA (US)

( * ) Notice: Subject to any disclaimer, the term of this patent is extended or adjusted under 35 U.S.C. 154(b) by 84 days.

This patent is subject to a terminal disclaimer.

(21) Appl. No.: 17/878,525

(22) Filed: Aug. 1, 2022

(65) Prior Publication Data

US 2022/0377339 A1    Nov. 24, 2022

Related U.S. Application Data

(63) Continuation of application No. 17/332,027, filed on May 27, 2021, now Pat. No. 11,438,594, which is a
(Continued)

(51) Int. Cl.
*H01L 29/94*    (2006.01)
*H04N 19/124*   (2014.01)
(Continued)

(52) U.S. Cl.
CPC ......... *H04N 19/124* (2014.11); *H04N 19/176* (2014.11); *H04N 19/625* (2014.11);
(Continued)

(58) Field of Classification Search
CPC ... H04N 19/124; H04N 19/176; H04N 19/625
See application file for complete search history.

(56) References Cited

U.S. PATENT DOCUMENTS

| | | | |
|---|---|---|---|
| 2007/0195385 A1* | 8/2007 | Matsuzaka | H04N 1/6027 358/520 |
| 2013/0215329 A1* | 8/2013 | Sroka Chalot | H04N 21/4438 348/E5.099 |

(Continued)

*Primary Examiner* — Joseph Suh
(74) *Attorney, Agent, or Firm* — OP Solutions IP Department; Paul Ackerman

(57) ABSTRACT

A video signal processor is provided, having an inverse quantizer, an inverse transform processor, an in-loop filter; and a decoded picture buffer. The video signal processor is configured to receive a video signal including a picture comprising quantized pixels, wherein the picture includes a first region and a second region. The first region comprising a first plurality of blocks and having a first quantization parameter based on a first average measure of spatial activity information of the first plurality of blocks; and a second region comprising a second plurality of blocks and having a second quantization parameter based on a second average measure of information of the second plurality of blocks. The inverse quantizer being configured to inverse quantize the pixels of the blocks comprising the first region using the first quantization parameter and inverse quantize the pixels of the blocks comprising the second region using the second quantization parameter.

8 Claims, 5 Drawing Sheets

Related U.S. Application Data continuation of application No. PCT/US2019/063698, filed on Nov. 27, 2019.

(60) Provisional application No. 62/771,907, filed on Nov. 27, 2018.

(51) Int. Cl.
  *H04N 19/137* (2014.01)
  *H04N 19/14* (2014.01)
  *H04N 19/17* (2014.01)
  *H04N 19/176* (2014.01)
  *H04N 19/625* (2014.01)

(52) U.S. Cl.
  CPC ............ *H04N 19/137* (2014.11); *H04N 19/14* (2014.11); *H04N 19/17* (2014.11)

(56) References Cited

U.S. PATENT DOCUMENTS

| | | | |
|---|---|---|---|
| 2014/0010278 A1* | 1/2014 | Lou | H04N 19/61 375/240.02 |
| 2015/0016510 A1* | 1/2015 | Carlsson | H04N 19/167 375/240.03 |
| 2015/0281693 A1* | 10/2015 | Okawa | H04N 19/14 375/240.03 |
| 2016/0366416 A1* | 12/2016 | Liu | G06T 7/246 |
| 2017/0099487 A1* | 4/2017 | Jun | H04N 19/146 |
| 2019/0052792 A1* | 2/2019 | Baba | H04N 13/327 |

* cited by examiner

VIDEO SIGNAL PROCESSOR FOR BLOCK-BASED PICTURE PROCESSING

CROSS-REFERENCE TO RELATED APPLICATIONS

This application is a continuation of co-pending U.S. application Ser. No. 17/332,027, filed on May 27, 2021, and entitled BLOCK-BASED PICTURE FUSION FOR CONTEXTUAL SEGMENTATION AND PROCESSING, which claims the benefit of International Application No. PCT/US19/63698 filed on Nov. 27, 2019 and entitled "BLOCK-BASED PICTURE FUSION FOR CONTEXTUAL SEGMENTATION AND PROCESSING," the entirety of which is incorporated herein by reference, which claims the benefit of priority of U.S. Provisional Patent Application Ser. No. 62/771,907, filed on Nov. 27, 2018, and titled "BLOCK-BASED PICTURE FUSION FOR CONTEXTUAL SEGMENTATION AND PROCESSING," each of which is incorporated by reference herein in its entirety.

FIELD OF THE INVENTION

The present invention generally relates to the field of video compression. In particular, the present invention is directed to block-based picture fusion for contextual segmentation and processing.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, ease of editing, random access, end-to-end delay (e.g., latency), and the like.

During encoding, a picture (e.g., video frame) is segmented (e.g., partitioned) into relatively large blocks, such as 128×128 and such structure is fixed. But by segmenting a picture into large blocks for compression and without taking into consideration the underlying video information (e.g., the video content), the large blocks may not partition the picture in a manner that allows for efficient encoding, thereby resulting in poor bit-rate performance.

SUMMARY OF THE DISCLOSURE

In an aspect a video bitstream processor includes an inverse quantizer, an inverse transform processor, an in loop filter, and a decoded picture buffer, wherein the video bitstream processor is configured to receive, using the inverse quantizer, a video bit stream including a picture comprising quantized pixels, wherein the picture includes a first region comprising a first plurality of blocks and having a first quantization parameter which has been controlled by an encoder based on a first average measure of information of the first plurality of blocks, and a second region comprising a second plurality of blocks and having a second quantization parameter which has been controlled by the encoder based on a second average measure of information of the second plurality of blocks.

In another aspect method includes receiving, by a video bitstream processor including an inverse quantizer, an inverse transform processor, an in loop filter, and a decoded picture buffer, a video bit stream including a picture comprising quantized pixels, wherein the picture includes a first region comprising a first plurality of blocks and having a first quantization parameter which has been controlled by an encoder based on a first average measure of information of the first plurality of blocks a second region comprising a second plurality of blocks and having a second quantization parameter which has been controlled by the encoder based on a second average measure of information of the second plurality of blocks.

In some embodiments, a video signal processor is provided which includes an inverse quantizer, an inverse transform processor, an in-loop filter; and a decoded picture buffer. The video signal processor can be configured to receive, using the inverse quantizer, a video signal including a picture comprising quantized pixels, wherein the picture includes a first region and a second region. The first region comprising a first plurality of blocks and having a first quantization parameter which has been controlled by an encoder based on a first average measure of spatial activity information of the first plurality of blocks. Preferably, the second region comprising a second plurality of blocks and having a second quantization parameter which has been controlled by the encoder based on a second average measure of information of the second plurality of blocks. In some embodiments, the inverse quantizer is configured to inverse quantize the pixels of the blocks comprising the first region using the first quantization parameter and inverse quantize the pixels of the blocks comprising the second region using the second quantization parameter.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Some implementations of the current subject matter are directed to an approach to encoding a video that performs picture segmentation using sample blocks as a basic unit. Sample blocks may have a uniform sample block size, which may a side length, in pixels of a square of pixels; for instance and without limitation, embodiments disclosed herein may use 4×4 sample blocks as a basic unit, thus aligning with some typical standard size of transforms in video and image coding. By utilizing 4×4 blocks as a basic segmentation size, some implementations of the current subject matter can allow for finer granularity by the encoder and such a size aligns with established transform block sizes, enabling utilizing of standard and defined transform matrices, which can improve encoding efficiency. Further, such an approach can be contrasted with some existing approaches to encoding, which use fixed block structure of relatively large size. Persons skilled in the art, upon reviewing the entirety of this disclosure, will appreciate that, while for the same of brevity 4×4 sample blocks are described in many ensuing examples, in general any size or shape of sample blocks, according to any method of measurement, may be used for picture partitioning and/or segmentation.

In some implementations, the current subject matter includes using area-based block fusion that allows contextual and semantic picture analysis and processing.

Figure 1:
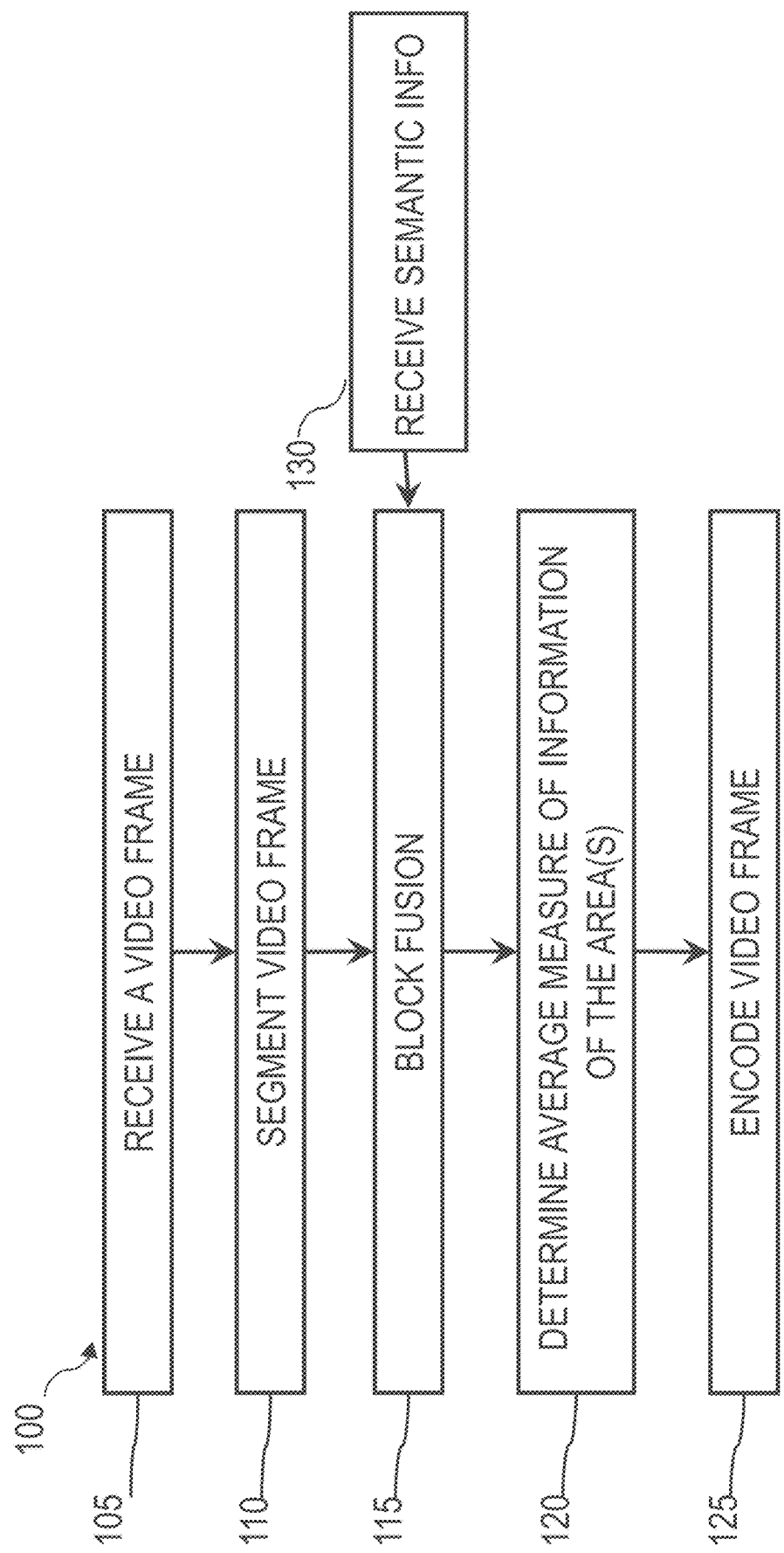
FIG. 1 is a process follow diagram illustrating an example process for encoding a video that can utilize 4×4 blocks as a basic segmentation size, which can allow for finer granularity by the encoder and such a size aligns with established transform block sizes.

FIG. 1 is a process follow diagram illustrating an example process for encoding a video that may utilize 4×4 blocks as a basic segmentation size, which may allow for finer granularity by an encoder implementing and/or performing the process; such a size may align with established transform block sizes. At step 105, a video frame is received by an encoder. This may be accomplished in any manner suitable for receiving a video in streaming and/or file form from any device and/or input port. Receiving video frame may include retrieval from memory of encoder and/or a computing device in communication with, incorporating, and/or incorporated in encoder. Receiving may include receiving from a remote device over a network. Receiving video frame may include receiving a plurality of video frames that combine to make up one or more videos.

At step 110, and continuing to refer to FIG. 1, encoder segments video frame into blocks, for instance by partitioning video frame into blocks, including without limitation blocks having a size 4 pixels by 4 pixels (4×4). A 4×4 size may be compatible with many standard video resolutions, which can be divided into an integer number of 4×4 blocks.

At step 115, and with continued reference to FIG. 1, block fusion is performed. Block fusion may include determining a first area within the video frame including a first grouping of a first subset of the blocks. In block fusion, each block may be assigned to an area. Assignment logic, such as without limitation semantic information, may be obtained from an outside source, which semantic information may be received at 130; as a non-limiting example, semantic information may include information provided from a face detector such that the semantic information includes data characterizing a facial detection. Accordingly, first grouping may be determined based on the received semantic information. In some implementations, assignment logic may be predefined, for example, according to a number of clustering or grouping algorithms. Encoder may be further configured to determine a second area within video frame including a second grouping of a second subset of the blocks.

Figure 2:
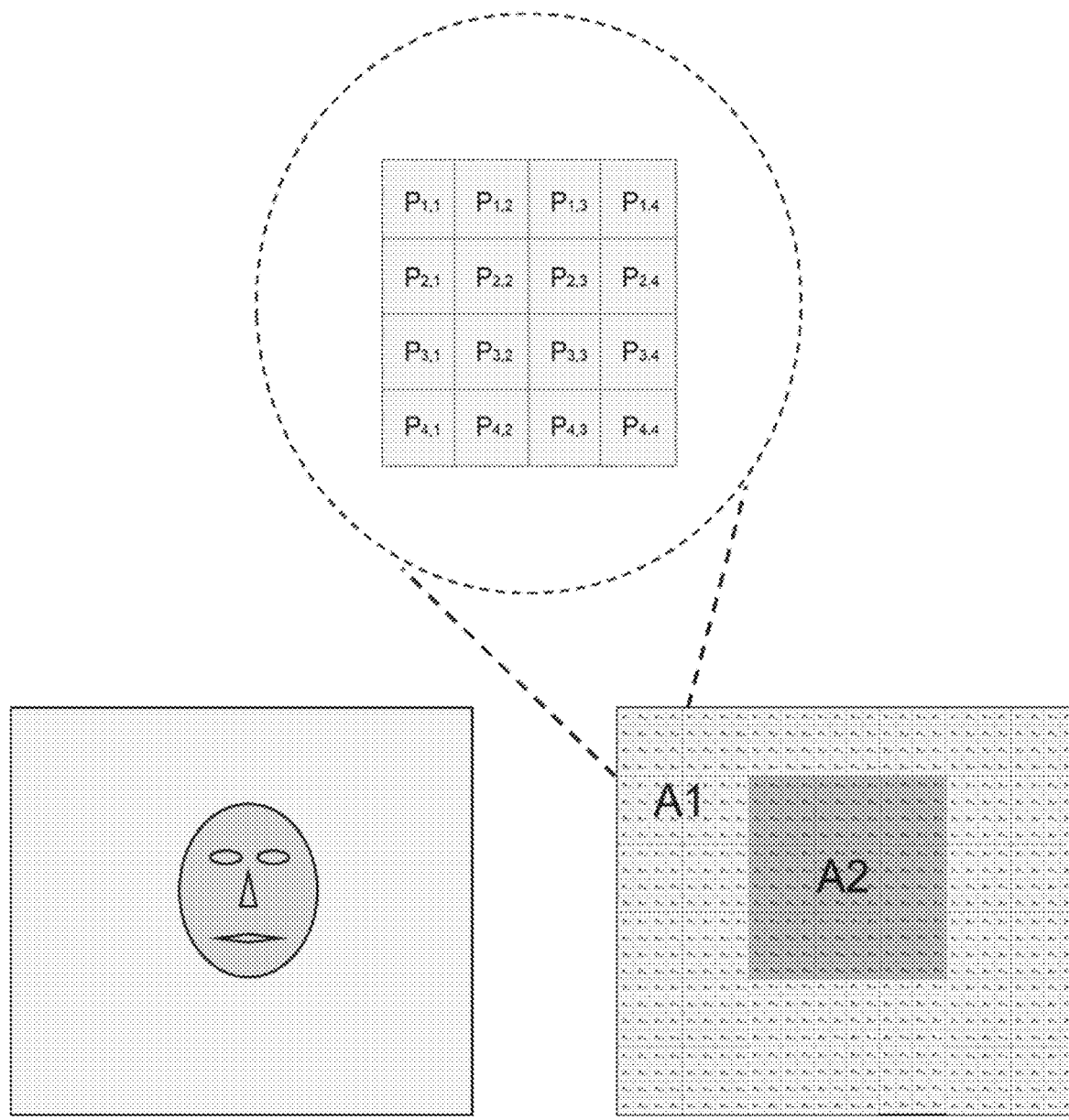
FIG. 2 is an illustrative example of the segmentation and fusion process for a picture with human face.

FIG. 2 is an illustrative example of the segmentation and fusion process for a picture with human face. Any block that has at least one pixel belonging to an object of interest, such as without limitation a face, as identified for example via received semantic information, may be assigned to a shaded area (A2), for instance according to the received semantic information, and fused with other blocks in that area.

Referring again to FIG. 1, at step 120, a first average measure of information of the first area may be determined. The measure of information can include, for example, a level of detail of the area. For example, a smooth area or a highly textured area may contain differing amounts of information.

Still referring to FIG. 1, first average measure of information can be determined, as a non-limiting example, according to a sum of information measures for individual blocks within first area, which may be weighted and/or multiplied by a significance coefficient, for instance a shown in the following sum:

$$A_N = S_N * \sum_{k=1}^{n} B_k$$

where N is a sequential number of the first area, $S_N$ is a significance coefficient, k is an index corresponding to a block of a plurality of blocks making up first area, n is a number of blocks making up the first area, $B_k$ is a measure of information of a block of the blocks, and $A_N$ is the first average measure of information. $B_k$ may include, for example, a measure of spatial activity computed using a discrete cosine transform of the block. For example, where blocks as described above are 4×4 blocks of pixels, a generalized discrete cosine transform matrix may include a generalized discrete cosine transform II matrix taking the form of:

$$T = \begin{pmatrix} a & a & a & a \\ b & c & -c & -b \\ a & -a & -a & a \\ c & -b & b & -c \end{pmatrix}$$

Where a is ½, b is $$\sqrt{\frac{1}{2}} \cos \frac{\pi}{8},$$

and c is $$\sqrt{\frac{1}{2}} \cos \frac{3\pi}{8}.$$

In some implementations, an integer approximation of a transform matrix may be utilized, which may be used for efficient hardware and software implementations. For example, where blocks as described above are 4×4 blocks of pixels, a generalized discrete cosine transform matrix may include a generalized discrete cosine transform II matrix taking the form of:

$$T_{INT} = \begin{pmatrix} 1 & 1 & 1 & 1 \\ 2 & 1 & -1 & -2 \\ 1 & -1 & -1 & 1 \\ 1 & -2 & 2 & -1 \end{pmatrix}.$$

For a block $B_i$, a frequency content of the block may be calculated using:

$$F_{Bi} = T \times B_i \times T'.$$

where T' is a transverse of a cosine transfer matrix T, $B_i$ is a block represented as a matrix of numerical values corresponding to pixels in the block, such as a 4×4 matrix representing a 4×4 block as described above, and the operation x denotes matrix multiplication. Measure of spatial activity may alternatively or additionally be performed using edge and/or corner detection, convolution with kernels for pattern detection, and/or frequency analysis such as without limitation FFT processes as described in further detail below.

Continuing to refer to FIG. 1, where encoder is further configured to determine a second area within the video frame as described above in reference to FIG. 1, for instance and without limitation including a second grouping of a second subset of the blocks, encoder may be configured to determine a second average measure of information of the second area; determining the second average measure of information may be accomplished as described above for determining a first average measure of information.

Still referring to FIG. 1, significance coefficient $S_N$ may be supplied by an outside expert and/or calculated based on the characteristics of first area (e.g., fused blocks). A "characteristic" of an area, as used herein, is a measurable attribute of the area that is determined based upon its contents; a characteristic may be represented numerically using an output of one or more computations performed on first area. One or more computations may include any analysis of any signal represented by first area. One non-limiting example may include assigning higher $S_N$ for an area with a smooth background and a lower $S_N$ for an area with a less smooth background in quality modeling applications; as a non-limiting example, smoothness may be determined using Canny edge detection to determine a number of edges, where a lower number indicates a greater degree of smoothness. A further example of automatic smoothness detection may include use of fast Fourier transforms (FFT) over a signal in spatial variables over an area, where signal may be analyzed over any two-dimensional coordinate system, and over channels representing red-green-blue color values or the like; greater relative predominance in a frequency domain, as computed using an FFT, of lower frequency components may indicate a greater degree of smoothness, whereas greater relative predominance of higher frequencies may indicate more frequent and rapid transitions in color and/or shade values over background area, which may result in a lower smoothness score; semantically important objects may be identified by user input. Semantic importance may alternatively or additionally be detected according to edge configuration, and/or texture pattern. A background may be identified, without limitation, by receiving and/or detecting a portion of an area that represents significant or "foreground" object such as a face or other item, including without limitation a semantically important object. Another example can include assigning higher $S_N$ for the areas containing semantically important objects, such as human face.

Figure 3:
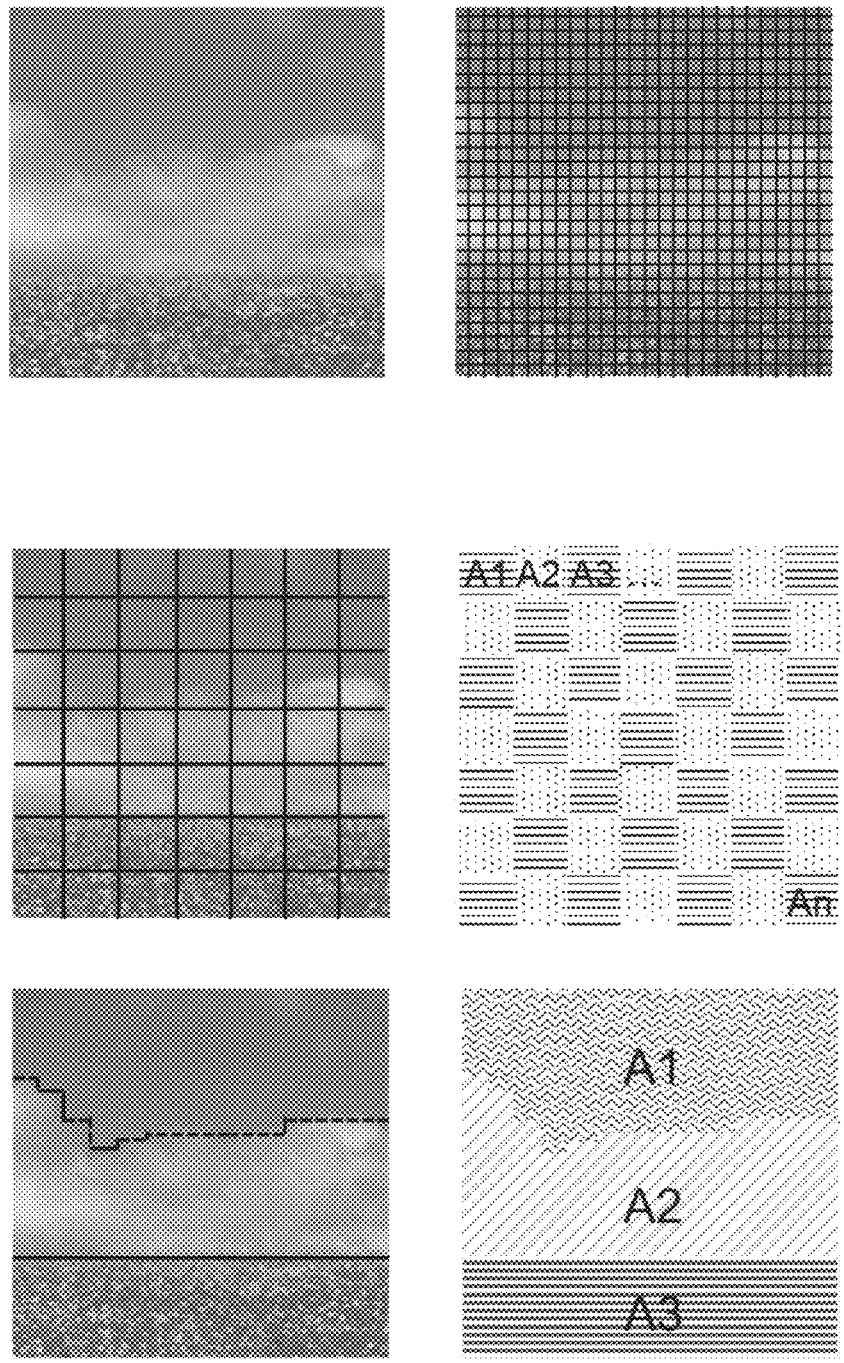
FIG. 3 is a series of images illustrating another example of the segmentation and fusion process according to some implementations of the current subject matter.

FIG. 3 is a series of images illustrating another example of a segmentation and fusion process according to some implementations of current subject matter. Input image (a) may be segmented into 4×4 blocks, as shown at (b). In (c), blocks may be fused using predefined logic into a set of larger areas, which may include without limitation a set of identical 16×16 areas, for instance as shown at (d). In (e) segmentation may be performed using semantic information, with corresponding areas (A1, A2, and A3) of segmented flower field, clouds, and the rest of the clear sky, shown at (f). In this example, area A3 would have the lowest significance coefficient, and area A1 highest (smoothest background).

Referring again to FIG. 1, at 125, the video frame may be encoded. Encoding may include controlling a quantization parameter based on the first average measure of information of the first area; quantization parameter may include, be equal to, be proportional to, and/or be linearly related to a measure of quantization size and/or a quantization level. As used in this disclosure, a "quantization level" and/or "quantization size" is a numerical quantity indicative of an amount of information to be discarded in compression of a video frame; quantization level may include, without limitation, a number such as an integer by which one or more coefficients including without limitation transform coefficients is divided and/or reduced to reduce information content of encoded and subsequent decoded frame. Controlling may include determining a first quantization size based on first measure of information; quantization level may represent a direct or indirect measure of memory storage needed to capture information describing luma and/or chroma data of pixels in a block, where a greater number of bits may be needed to store information having a greater degree of variance as determined by first measure of information. Quantization size may be based upon first measure of information as described above, where quantization size may be larger for a larger first measure of information and smaller for a smaller first measure of information; quantization size may be proportional and/or linearly related to first measure of information. In general, greater information content may result in larger quantization size. By controlling quantization size, information about fused-block areas may be used for rate distortion optimization for encoding.

Controlling may be further based on the second average measure of information of the second area. In some implementations, the first average measure of information can be used for quality calculations.

Figure 4:
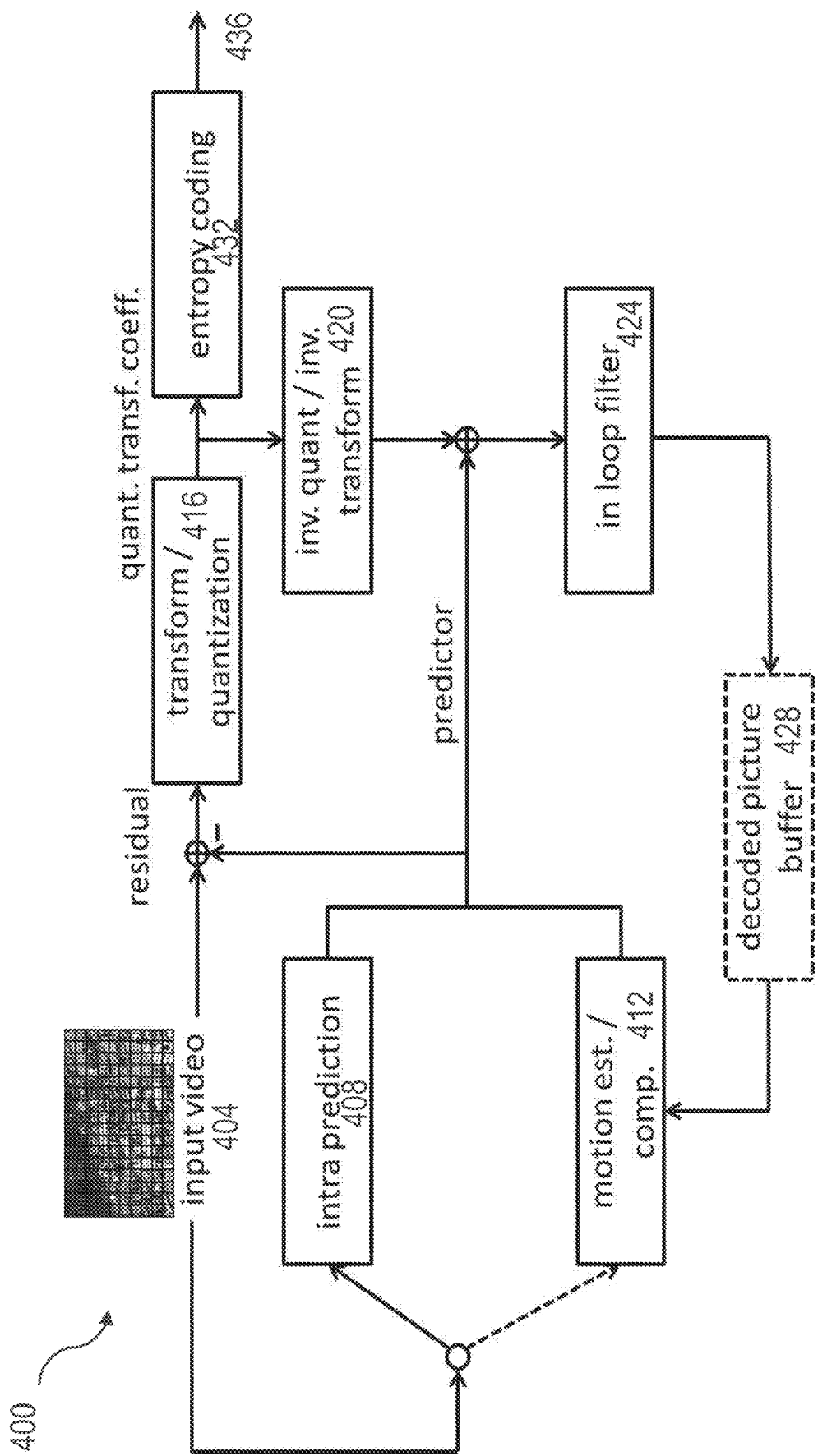
FIG. 4 is a system block diagram illustrating an example video encoder capable of block-based picture fusion and contextual segmentation and processing.

FIG. 4 is a system block diagram illustrating an example video encoder 400 capable of block-based picture fusion and contextual segmentation and processing. The example video encoder 400 receives an input video 404, which may be initially segmented or partitioned into 4×4 blocks for further processing.

Continuing to refer to FIG. 4, example video encoder 400 includes an intra prediction processor 408, a motion estimation/compensation processor 412 (also referred to as an inter prediction processor), a transform/quantization processor 416, an inverse quantization/inverse transform processor 420, an in-loop filter 424, a decoded picture buffer 428, and an entropy coding processor 432. Bit stream parameters may be input to the entropy coding processor 432 for inclusion in the output bit stream 436.

Still referring to FIG. 4, transform/quantization processor 416 may be capable of performing block fusion and computing the measure of information for each region.

With continued reference to FIG. 4, in operation, for each block of a frame of the input video 404, whether to process the block via intra picture prediction or using motion estimation/compensation may be determined. The block may be provided to the intra prediction processor 408 or the motion estimation/compensation processor 412. If the block is to be processed via intra prediction, the intra prediction processor 408 may perform the processing to output the predictor. If the block is to be processed via motion estimation/compensation, the motion estimation/compensation processor 412 may perform the processing.

Still referring to FIG. 4, a residual may be formed by subtracting the predictor from the input video. The residual may be received by the transform/quantization processor 416, which may perform transformation processing (e.g., discrete cosine transform (DCT)) to produce coefficients, which may be quantized. The quantized coefficients and any associated signaling information may be provided to the entropy coding processor 432 for entropy encoding and inclusion in the output bit stream 436. In addition, the quantized coefficients may be provided to the inverse quantization/inverse transformation processor 420, which may reproduce pixels, which may be combined with the predictor and processed by the in-loop filter 424, the output of which is stored in the decoded picture buffer 428 for use by the motion estimation/compensation processor 412.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which can be special or general purpose, coupled to receive data and instructions from, and to transmit data and instructions to, a storage system, at least one input device, and at least one output device.

Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
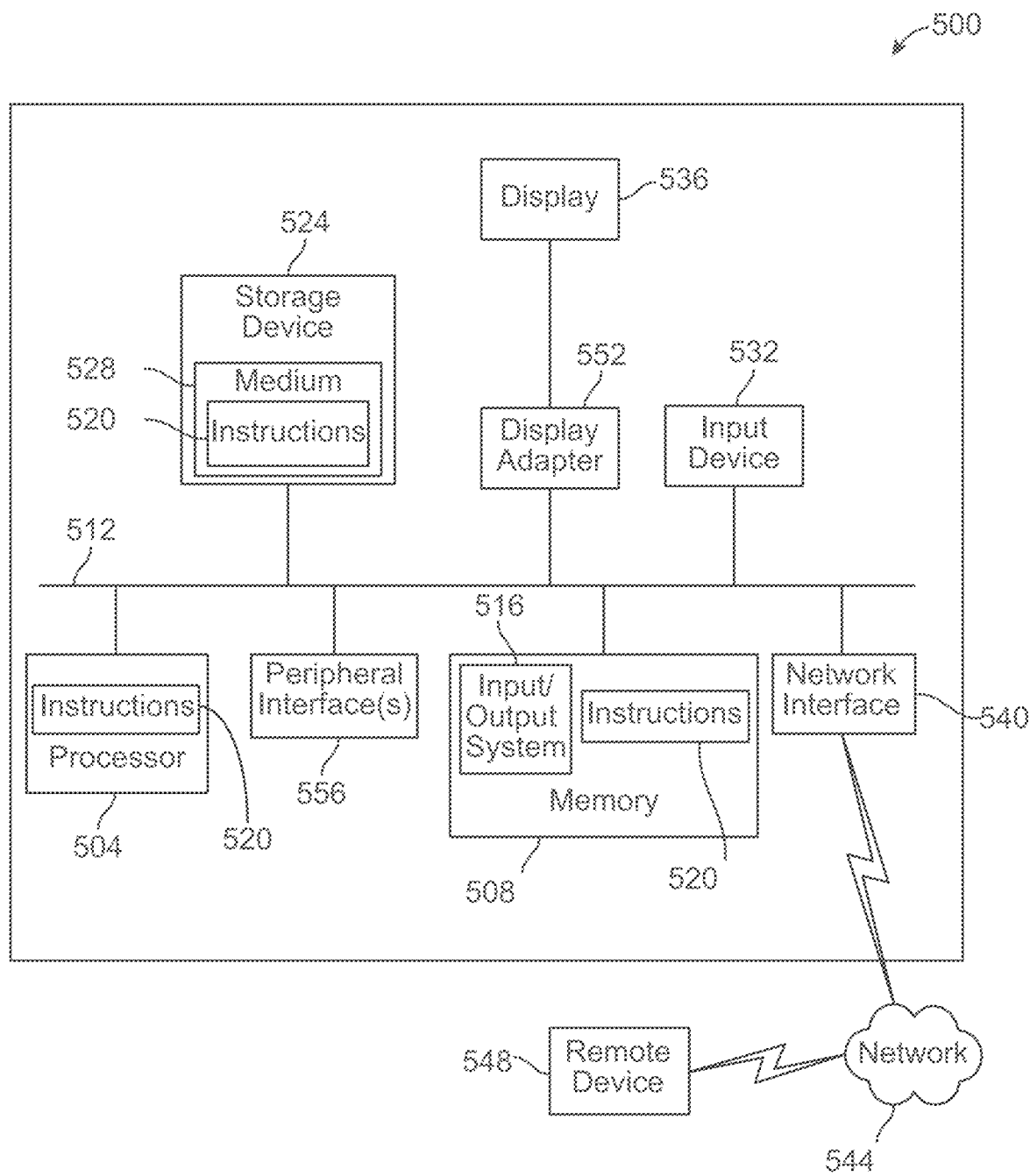
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524)

include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof.

Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments as disclosed herein.

Accordingly, this description is meant to be taken only by way of example, and not to otherwise limit the scope of this invention.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A video signal processor comprising:
an inverse quantizer;
an inverse transform processor;
an in-loop filter; and
a decoded picture buffer;
wherein the video signal processor is configured to receive, using the inverse quantizer, a video signal including a picture comprising quantized pixels, wherein the picture includes:
a first region containing a foreground object and comprising a first contiguous plurality of blocks each having a common first quantization parameter which has been controlled by an encoder based on a first average measure of information based on spatial activity of the first plurality of blocks; and
a second region containing a background and comprising a second contiguous plurality of blocks each having a common second quantization parameter which has been controlled by the encoder based on a second average measure of information based on spatial activity of the second plurality of blocks;
the inverse quantizer being configured to inverse quantize the pixels of the blocks comprising the first region using the first quantization parameter and inverse quantize the pixels of the blocks comprising the second region using the second quantization parameter.

2. The processor of claim 1 wherein the picture comprises at least one 128×128 coding unit.

3. The processor of claim 1, wherein the first average measure of information based on spatial activity is determined by calculating a sum of a plurality of information measures of the plurality of blocks.

4. The processor of claim 1 wherein the second average measure of information based on spatial activity is determined using a discrete cosine transform of the blocks in the second plurality.

5. A video signal processor comprising:
an inverse transform processor;
an in-loop filter;
a decoded picture buffer; and
an inverse quantizer configured to receive a video signal including a picture comprising quantized pixels, wherein the picture includes:
a first region containing a foreground object and comprising a first contiguous plurality of blocks each having a common first quantization parameter determined based on a first average measure of information based on spatial activity of the first plurality of blocks; and
a second region containing a background and comprising a second contiguous plurality of blocks each having a common second quantization parameter determined based on a second average measure of information based on spatial activity of the second plurality of blocks;
wherein the inverse quantizer is configured to inverse quantize the pixels of the blocks comprising the first region using the first quantization parameter and inverse quantize the pixels of the blocks comprising the second region using the second quantization parameter.

6. The processor of claim 5 wherein the picture comprises at least one 128×128 coding unit.

7. The processor of claim 5, wherein the first average measure of information based on spatial activity is determined by calculating a sum of a plurality of information measures of the plurality of blocks.

8. The processor of claim 5 wherein the second average measure of information based on spatial activity is determined using a discrete cosine transform of the blocks in the second plurality.

* * * * *